United States Patent [19]
Nohynek

[11] 3,911,860
[45] Oct. 14, 1975

[54] DEVICE FOR THE CONTINUOUS PRODUCTION OF DRAGEES

[75] Inventor: Odon Nohynek, Autenweiler Kreis Oberlingen, Germany

[73] Assignee: Firma Driam Metallprodukt GmbH & Co. KG, Eriskirch (Bodensee), Germany

[22] Filed: May 8, 1974

[21] Appl. No.: 468,074

[30] Foreign Application Priority Data
May 8, 1973 Germany............................. 2323194

[52] U.S. Cl. ........................... 118/6; 118/7; 118/19; 118/25; 427/242
[51] Int. Cl.²......................................... A23G 3/26
[58] Field of Search........... 118/6, 7, 19, 20, 24, 25, 118/417, 418, 426, 303, 8; 117/109; 427/242

[56] References Cited
UNITED STATES PATENTS

| | | | |
|---|---|---|---|
| 2,652,805 | 9/1953 | D'Angelo............................. | 118/19 |
| 3,101,040 | 8/1963 | Lanz..................................... | 118/19 |
| 3,123,498 | 3/1964 | Terbraak et al. ..................... | 118/19 |
| 3,408,980 | 11/1968 | Benson ................................. | 118/19 |
| 3,419,015 | 12/1968 | Wochnowski......................... | 118/8 |
| 3,438,353 | 4/1969 | Pellegrini............................. | 118/19 |
| 3,573,966 | 4/1971 | Hostetler ............................. | 118/19 |
| 3,595,680 | 7/1971 | Fischer et al. ....................... | 118/19 |
| 3,608,516 | 9/1971 | Temple................................. | 118/19 |

Primary Examiner—Mervin Stein
Assistant Examiner—Douglas Salser
Attorney, Agent, or Firm—Joseph A. Geiger

[57] ABSTRACT

A device for the continuous coating of dragees with a dragee coating material inside a coating drum and for the subsequent application and glossing of a protective skin over the coating inside a coaxially connected after-treatment drum, the latter including multiple concentrically arranged drum walls with conveying baffles and an exhaust blower for the solidification of the protective skins. A control unit coordinates the feed rates of dragee cores and coating material with the speed of the drums.

13 Claims, 1 Drawing Figure

U.S. Patent  Oct. 14, 1975  3,911,860
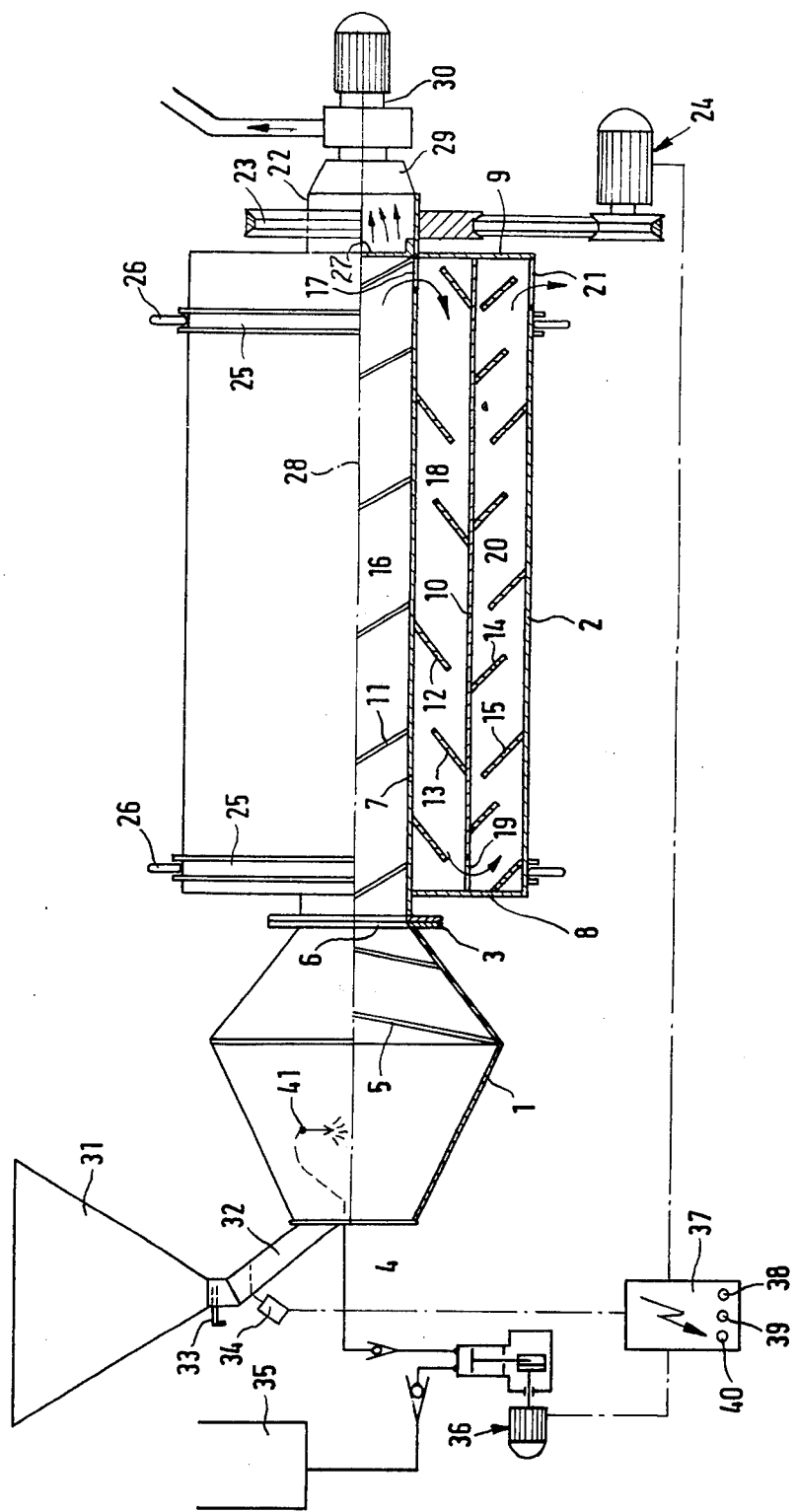

DEVICE FOR THE CONTINUOUS PRODUCTION OF DRAGEES

BACKGROUND OF THE INVENTION

1. Field of the Invention

The invention relates to a device for the continuous production of dragees, the device including a coating drum rotating around a substantially horizontal axis and having a feed opening on one axial end thereof for the introduction of dragee cores and coating material and a discharge opening on its other end to which is connected a device for the after-treatment of the dragee coating.

2. Description of the Prior Art

Dragees, following the coating process in which a coating is applied to the dragee core, are normally subjected to an after-treatment aimed at the modification of the dragee coating or at the additional application of a special protective skin layer over the dragee coating. In most cases, the otherwise finished dragees are "glossed" or "polished," i.e., a material such as wax, which is impermeable to air and humidity is applied in a thin layer, whereupon it is hardened and smoothed, producing a high quality gloss. This "glossing" has in the past been mostly produced in a manual batch process in dragee drums which have to be specially prepared for this process. Of particular significance in this glossing procedure are the shape, arrangement and operating conditions of the dragee drum, as well as the kind of gloss material used. In most cases, the inside walls of a dragee drum are coated with a wax layer, using one of a variety of hard waxes, which may be applied in either solid, pasty, or liquid form, or as an emulsion. Following a certain period of initial rotation, the openings of the dragee drum are at least partially closed and the drum is rotated for a period between 1 and 3 hours. This procedure is too costly, especially when it is desired to produce low-priced sweets, such as, for example, chocolate-covered nuts, raisins, popcorn, and the like.

From the prior art is known a cylindrical dragee drum which rotates around the horizontal axis inside a closed housing through which is passed heated air, the drum having on both axial ends centrally located feed and discharge openings. Behind the drum are arranged three oppositely moving conveyor belts and a sorting device which returns the smaller dragees to the drum for a new treatment cycle. One disadvantage of this arrangement is that it is too costly, especially for the production of chocolate-covered popcorn. Furthermore, this device is suitable only for drying of the applied skin coating, but not for a "glossing" of the latter. A device of this kind is disclosed in the German Offenlegungsschrift (published application) No. 1,532,380.

SUMMARY OF THE INVENTION

It is therefore an objective of the invention to construct a device of the earlier-mentioned type in a most simple manner, so as to make possible a continuous complete production of dragees, including their after-treatment which includes a "glossing" process.

For this purpose, the invention suggests the coaxial connection of an after-treatment drum to the dragee drum, for rotation with the latter around a common rotational axis. In the preferred and most simple embodiment of the invention both drums are fixedly and sealingly connected to one another, but the drums may also be journalled separately and may be driven at different speeds, or may be rotationally interconnected by means of a variable-speed transmission. The last-mentioned embodiment, in particular, has the advantage that the duration and the intensity of the coating process during after-treatment can be adapted to each particular product. The overall costs are still comparatively low, even in the latter case, the two separate procedures being always performed continuously and one following the other, without any special manipulative steps required. The treatment spaces inside the two drums may remain open to one another, or they may be closed off to a limited extent. Thus, it is possible to maintain a drying atmosphere in the after-treatment drum either continuously or for certain time periods, without any substantial amount of drying air flowing through the dragee drum. Cores and coating material may be introduced into the dragee drum either continuously, or at given points in time in the form of discrete charges which are controlled automatically. Similarly, additional coating material may be fed to the after-treatment drum either continuously or in discrete charges. In all cases, the dragees are continuously worked in the after-treatment drum so that they acquire a glossy surface. The common rotational axis need not be exactly horizontal, but may be slightly inclined.

The dragee drum may appropriately have the shape of a double frustum, or of a converter pear, while the after-treatment drum is cylindrical. Both drums are equipped with helical-screw type conveying baffles. In the dragee drum, in particular, it may be desirable to arrange retaining baffles or variously oriented baffles, in order to increase the duration of stay in the drum. The rate of axial advance through the dragee drum is always considerably smaller than through the after-treatment drum, where it is important that the dragee surface is in contact with the drum wall over as large a portion of its path as possible.

The after-treatment drum can be rotationally supported in a comparatively simple manner, by means of bearing collars and cooperating stationary bearing rollers, while the dragee drum is mounted in a cantilever arrangement on one end of the after-treatment drum.

The after-treatment drum is preferably equipped with at least one inner drum, one of its ends being connected to the discharge opening of the dragee drum and the other end having openings to the outer drum space, the radially adjacent inner and outer drum spaces being equipped with oppositely working conveying baffles. Using several of these concentrically arranged drum spaces, it becomes possible to obtain a long treatment path, and a correspondingly extended after-treatment, even within a limited overall length of the device.

The after-treatment drum is arranged to be coated with a layer of protective skin material, such as solvent-diluted wax, for example, for the application of the outer skin to the dragees, and a continuous supply of this skin material to at least the inner drum may be provided.

On the axial end of the after-treatment drum opposite its end connected to the dragee drum, is appropriately arranged a blower, preferably an exhaust blower, in coaxial alignment with the rotational axis of the drum. This arrangement may include a stationary connecting portion of the blower housing which cooperates with the free end of the rotating inner drum in a centered, sealing manner, the connection including an end screen separating the after-treatment drum from the blower. This end screen retains the dragees inside the drum, while permitting air or treatment gas to be freely exhausted from the drum interior. No special gasket is required for this arrangement; the inner drum may even be extended axially beyond the end wall of the outer drum and may carry a drive pulley for the drum drive.

In conjunction with the proposed continuous treatment, it is preferable to provide automatic controls for the supply of proportionate quantities of dragee cores and coating material to the dragee drum. These controls may be coordinated with variable-speed controls for the drum drive. In the case where additional treatment material is to be fed into the after-treatment drum, these material quantities, too, may be controlled by means of the central control device, which latter may include separate speed controls for both drums, if they are separately journalled and separately driven. Even where it is desirable to have the interdependency of each of the five above-mentioned parameters adjustable, the total cost of these controls is still relatively small.

BRIEF DESCRIPTION OF THE DRAWING

The FIGURE of the drawing illustrates schematically, by way of example, a preferred embodiment of the invention.

DESCRIPTION OF THE PREFERRED EMBODIMENT

In the drawing, reference numeral 1 refers to a double-frustum-shaped dragee drum and reference numeral 2 refers in general to a cylindrical after-treatment drum. The two drums are arranged coaxially and are fixedly connected to each other by means of a flange connection 3. This pear-shaped or converter-shaped dragee coating drum has a long, slim cone on its front frustum and a shorter, flatter cone on its rear frustum, the free front end of the drum defining an axial feed opening 4. On the inner wall of the rear frustum, the dragee drum includes conveying baffles 5 which are so arranged in relation to the direction of rotation that they retain the dragees inside the dragee converter, allowing only a few dragees at a time to be discharged through the rear discharge opening 6. Since the discharging dragees move through this discharge opening only closely above the lower edge of the latter, it is possible to obturate the major portion of this opening by means of a cover so that only an annular discharge opening remains.

The discharge opening 6 leads to an inner drum 7 of approximately the same diameter, and which is an integral part of an after-treatment drum 2. Between these two treatment drums is arranged a cylindrical intermediate drum 10, the drums being connected by means of common end walls 8 and 9. The inner drum 7 and the intermediate drum 10 carry on their inner and outer walls helical-screw type conveying baffles 11, 12 and 13, 14, respectively. Similar conveying baffles 15 are arranged on the inside of the outermost treatment drum 2. These conveying baffles 11–15 are so arranged that the dragees are axially conveyed through rotation of the drum, first through the inner drum space 16 toward the right-hand side of the device shown in the drawing. Near the end of the inner drum, they fall through a radial transfer opening 17 in the drum wall into the intermediate drum space 18 inside which they are conveyed to the left, until they fall again through radial transfer openings 19 into the outer drum space 20 from which they emerge to the outside through additional peripherally arranged discharge openings 21. The discharged dragees are then collected and removed.

The inner drum 7 extends axially through the end wall 9 to the outside thereof. On the protruding drum portion 22 is mounted a V-belt pulley 23 of a variable-speed drum drive which is generally designated by reference numeral 24, the pulley 23 being adjustable for different speeds, if desired. The rotational support for the entire drum arrangement is provided by means of two bearing collars 25 attached to the outer periphery of the after-treatment drum, the collars being engaged by stationary bearing rollers 26. The dragee drum 1 extends axially from the after-treatment drum 2 without additional rotational support.

The inner drum space 16 is closed toward the right-hand side in the drawing by means of an end screen 27 which is arranged in the plane of the end wall 9, thereby safely retaining the dragees, while allowing air to pass through. To the open drum end 22 of the inner drum is connected, with a small clearance, or via a rotary seal, a stationary intake funnel 29 of an exhaust blower 30, the latter being arranged coaxially with the rotational axis 28 of the drum. The blower 30 draws air through the end screen 27 from the drum to the outside. A major portion of the exhausted air enters the after-treatment drum through its discharge openings 21. This air stream is all the larger, the smaller one chooses to make the annular gap in the discharge opening 6 of the dragee drum.

The dragee cores are introduced into the dragee drum 1 through its feed opening 4 from a feed funnel 31 connected to the opening 4 by means of an inclined feed channel 32. On the lower end of the funnel is arranged a manually operable shutoff gate 33. At 34 is shown an electrically controllable flow gate by means of which the continuously supplied quantity of dragee cores is adjustable.

The coating material is supplied from a container 35 by means of a feed pump 36 whose speed may be adjustable, if desired, the coating material being sprayed into the dragee converter 1 through a spray nozzle 41, in a known manner. The flow gate 34, the feed pump 36, and the variable-speed drive 24 are governed by a central control unit 37, the latter including a first control means 38 for the adjustment of the drum speed, a second control means 39 for the adjustment of the flow gate 34 as a function of the drum speed, and a third control means 40 for the adjustment of the volume, or the charge cycle duration, of the pump 36 as a function of the adjustment of the flow gate 34. In the place of such a flow gate may also be used other suitable dosing devices for the continuous feed, or the intermittent-charge introduction of dragee cores into drum 1.

Assuming that dragees are to be produced with a core material having a wrinkled surface, as in the case with raisins or popcorn, and that the coated cores are to be glossed, it will be necessary that the after-treatment drum 2, especially the inner drum 7, is coated with a suitable gloss material in the required manner. This coating can be applied, for example, through the free end of the dragee drum.

Prior to startup of the device, the control means 38 is adjusted for a given drum speed, the control means 39 is adjusted for the rate at which cores are to be introduced at this speed, and the control means 40 is adjusted for the quantity of coating material which is necessary to cover their surface. An alternative possibility is to initially fill the dragee drum with a given amount of dragee cores, before the start of the continuous coating operation, whereupon the drum is started up and the necessary quantity of coating material is sprayed into it. The quantity of cores thus introduced into the drum is normally smaller than the quantity of dragees which are normally contained in the drum. This initial quantity is first almost completely treated, before the continuous operation is initiated. The quantity of dragees contained in the drum then increases steadily, the dragees being initially retained by the baffles 5 from leaving through the discharge opening 6. Thus, the degree of coating received increases inside the drum from the feed end to the discharge end. The result is therefore very evenly coated dragees which are transferred to the inner drum 7, first at a slowly increasing rate, and later at a constant rate. These dragees then advance gradually through the three drum spaces toward the discharge opening 21. In this advance, the inner dragee coating is first covered with a wax skin, which is then polished or glossed through the continuous rolling of the dragees against the drum walls. The solvent component contained in the wax mass is thereby continuously reduced through the passing air stream and the wax layer is largely solidified, or hardened and dried, at the time of exit from the after-treatment drum.

For the extended operation of the device, it is also possible to provide a continuous supply of new wax or a similar protective layer material, particularly to the surface of the inner drum, the supply means being appropriately arranged in the rotational axis 28, using a supply line which extends either through the dragee drum or through the exhaust blower. The quantity of wax supplied can again be adjusted automatically by means of the control unit 37, preferably through a fourth control means adjusting the quantity of wax as a function of the core feeding rate set at the control means 39. Lastly, if the dragee drum is driven independently of the after-treatment drum, it is also possible to adjust its speed through the control unit 37. In this case, the remaining control parameters, including the setting of the variable-speed drive 24, are preferably adjusted as a function of the selected speed of the dragee drum.

In the case where it is desirable to produce dragees in several successive coating and after-treatment steps, it is possible to equip the device with a conveyor which returns the treated dragees from the discharge openings 21 to the dragee drum 1, or which automatically transfers them to the dragee drum of a second coating and after-treatment device.

It should be understood, of course, that the foregoing disclosure describes only a preferred embodiment of the invention and that it is intended to cover all changes and modifications of this example of the invention which fall within the scope of the appended claims.

I claim:

1. A device for the continuous production of dragees through the coating and glossing of dragee cores, the device comprising in combination:
    a dragee coating drum arranged for rotation around a substantially horizontal axis and having a feed opening at one axial end and a discharge opening at its other end;
    an after-treatment drum likewise arranged for rotation around a substantially horizontal axis and having an inlet opening for the reception of coated dragees from the coating drum and a discharge opening for the discharge of treated dragees;
    means for continuously conveying the dragees axially from the feed opening of the coating drum through the latter and into and through the after-treatment drum;
    means for continuously driving both drums;
    means for feeding dragee cores to the coating drum at a controllable rate;
    means for feeding coating material to the coating drum at a controllable rate; and
    means for applying a glossable protective outer skin to the coated dragees during their passage through the after-treatment drum, said skin applying means including a layer of solvent-diluted wax on an inner wall of the after-treatment drum which is being contacted by advancing coated dragees, and means for solidifying said wax on the coated dragees, following such contact application.

2. A device as defined in claim 1, wherein
    the dragee coating drum and the after-treatment drum are arranged on a common axis and axially adjacent to one another, the discharge opening of the coating drum leading directly into the inlet opening of the after-treatment drum.

3. A device as defined in claim 2, wherein:
    the two drums are directly coupled to one another by means of a flange connection; and
    the drum driving means includes a drive which is connected to only one of the two drums.

4. A device as defined in claim 3, wherein:
    the after-treatment drum further includes at least two bearing collars surrounding the drum, and a plurality of stationary bearing rollers engaging said collars;
    the dragee coating drum is supported by the after-treatment in a cantilever-type mounting arrangement; and
    the drum driving means is connected to the after-treatment drum.

5. A device as defined in claim 1, wherein:
    the dragee-coating drum is converter-shaped, having a double-frustum outline;
    the after-treatment drum is generally cylindrical in outline; and
    the dragee conveying means includes a series of helical-screw-type conveying baffles arranged in at least the after-treatment drum.

6. A device as defined in claim 1, wherein:
    the after-treatment drum further includes:
    a substantially cylindrical outer drum casing with end walls on both axial ends thereof;
    an inner drum of smaller diameter arranged concentrically with respect to the outer drum casing and substantially inside its end walls, the inlet opening of the after-treatment drum leading directly into one end of the inner drum; and a transfer passage near the other end of the inner drum leading from the latter into the annular space of the outer drum casing; and wherein the dragee conveying means includes a first series of conveying baffles inside the inner drum for conveying the dragees from its inlet opening to its transfer passage, and a second series of conveying baffles inside the outer drum casing for conveying the dragees in the opposite direction.

7. A device as defined in claim 6, wherein:

the after-treatment drum still further includes: an intermediate drum arranged concentrically between the inner drum and the drum casing; and a second transfer passage near the end opposite said first transfer passage of the inner drum; and the dragee conveying means further includes a third series of conveying baffles inside the intermediate drum casing; the conveying direction in each radially successive drum space being opposite to that in the preceding drum space.

8. A device as defined in claim 6, wherein the wax solidifying means includes a blower for the creation of a flow of solvent removing air through the after-treatment drum.

9. A device as defined in claim 8, wherein:

the blower is an exhaust blower arranged coaxially adjacent to the inner drum of the after-treatment drum and having an intake opening arranged substantially sealingly in relation to the transfer passage end of said inner drum; and the inner drum further includes an axial opening on said end and an end screen closing said opening by separating its inner space of the inner drum from the blower intake space.

10. A device as defined in claim 6, wherein:

the inner drum extends axially beyond the end wall of the after-treatment drum on at least one side thereof; and said axial extension carries a drive pulley as part of the drum driving means.

11. A device as defined in claim 1, wherein:

the drum driving means includes a variable-speed drive;

the dragee feeding means includes means for varying its feeding rate; and the coating material feeding means also includes means for varying its feeding rate;

the device further including:

an electronic control means for adjustably interrelating the operating parameters of the three aforementioned means for the continuous coating and after-treatment of a given kind of dragees.

12. A device as defined in claim 11, wherein:

the coating material is pumpable;

the coating material feeding means includes a pump with a pump drive, and a feed pipe with a spray nozzle located inside the coating drum; and the electronic control means is adapted to actuate the pump at intervals for adjustable periods of time, so as to supply coating material to said drum in discrete charges.

13. A device as defined in claim 11, wherein:

the dragee core feeding means includes a feeding hopper, an inclined feeding channel reaching through the feed opening of the dragee coating drum, and an adjustable control gate in said feeding channel; and the electronic control means includes means for adjusting the position of said control gate in response to changes in said operating parameters.

* * * * *